[19] United States Patent
Yang

[10] Patent No.: US 7,021,600 B2
[45] Date of Patent: Apr. 4, 2006

(54) ADJUSTMENT LATCH STRUCTURE FOR A FOLDING BRACKET OF DISPLAY DEVICES

(75) Inventor: Shun-Ho Yang, Kaohsiung (TW)

(73) Assignee: King Slide Works Co., LTD, (TW)

( * ) Notice: Subject to any disclaimer, the term of this patent is extended or adjusted under 35 U.S.C. 154(b) by 120 days.

(21) Appl. No.: 10/842,559

(22) Filed: May 11, 2004

(65) Prior Publication Data

US 2005/0253040 A1 Nov. 17, 2005

(51) Int. Cl.
A47G 29/00 (2006.01)

(52) U.S. Cl. .................................................... 248/688

(58) Field of Classification Search ................ 248/688, 248/121, 122.1, 123.11, 124.1, 125.1, 125.2, 248/125.3, 917, 918, 919, 920, 150, 292.12
See application file for complete search history.

(56) References Cited

U.S. PATENT DOCUMENTS

2002/0001049 A1* 1/2002 Endo et al. ................... 349/58
2003/0231460 A1* 12/2003 Moscovitch ................. 361/681
2005/0205725 A1* 9/2005 Yokouchi et al. ......... 248/125.1

* cited by examiner

Primary Examiner—Robert P. Olszewski
Assistant Examiner—Todd M. Epps
(74) Attorney, Agent, or Firm—Harness, Dickey & Pierce, P.L.C.

(57) ABSTRACT

An adjustment latch structure for a folding bracket of display devices includes a base dock pivotally coupled with a bracket, and a bracing rack having one end pivotally engaged with the base dock and another end pivotally coupled with a sliding member slidable relative to the bracket and having an inner end extended to an inner side of the bracket to fasten to an anchor blade having a front side coupled with a latch member movable upwards. A pulling member is located under the latch member having protrusive members extended into housing slots of the latch member and pressed by an elastic element, and has returning spring on one end. The entire structure is located in the center in a symmetrical fashion in normal conditions. When pulls the pulling member, the sliding member slides relative to the bracket to adjust the angle of the bracket relative to the base dock.

2 Claims, 8 Drawing Sheets

ADJUSTMENT LATCH STRUCTURE FOR A FOLDING BRACKET OF DISPLAY DEVICES

FIELD OF THE INVENTION

The present invention relates to an adjustment latch structure for a folding bracket of display devices and particularly to an improved adjustment latch structure for a folding bracket of flat display devices to smooth angular adjustment operation of the bracket.

BACKGROUND OF THE INVENTION

These days a liquid crystal display (LCD) device is widely used with computer equipment. Thin and compact sizes are big advantages of the LCD device. It also can save energy consumption and installation space. However, the flat LCD device alone is difficult to be mounted on a desktop. Hence the LCD device generally has to be coupled with a bracket (base dock) for standing upright. The bracket also serves to adjust the angle of the LCD device. In addition, in order to shrink the package size and facilitate hanging on the wall, the bracket that is foldable to the back side of the LCD device has been developed and introduced.

Referring to FIG. 1, the conventional folding bracket for LCD devices mainly has a mechanism which includes a base dock A pivotally coupled with a bracket B that may be extended to an L-shape (or <-shape). The display device (not shown in the drawing) is coupled on the back side of the bracket B. The base dock A and the bracket B are bridged by a bracing rack C which is pivotally coupled on the base dock A. The bracing rack C has a sliding member D slidable in a sliding flute B1 formed on the bracket B for adjusting and positioning. The juncture of the sliding member D and the sliding flute B1 has a latch unit to control sliding and anchoring. Referring to FIG. 2, the latch unit mainly includes a pulling member E located on the back side of the bracket B. The pulling member E has a plurality of slant slots E1 to couple with latch struts F and is pulled by an elastic element G. It also has a track flute E2. The sliding member D has an inner end extended to an inner side of the bracket B to couple with an anchor blade H which is movable transversely. The anchor blade H has a lug H1 on one side extended into the track flute E2 and another side formed in teeth to engage with a gear rack I located on a corresponding location. When the pulling member E is pulled upwards, the slant slots E1 urge the latch struts F to generate a sideward movement to drive the anchor blade, H moving in the transverse direction simultaneously. The teeth of the anchor blade H are moved away from the gear rack I, and the sliding member D is slidable in the sliding flute B1. Then the bracket B may be pivotally turned relative to the base dock A to adjust the angle of the display device.

The latch unit adopted in the conventional design set forth above has problems when in use, notably:
1. The pulling member is not located in the center of the bracket. It is spaced from the left side and the right side at different distances, hence is not convenient for people to use with the right hand and left hand.
2. When the pulling member is lifted, a transverse movement occurs at the same time. The force applying point of users might slip away and hinder operation.
3. The pulling member is located on the inner side of the latch struts and the anchor member. The same relationship exists between the anchor member and the sliding member. Friction takes place and wearing occurs during operation. Tolerance increases after use for a period of time.

The components might become not effective, and operation becomes not smooth. There is still room for improvement.

SUMMARY OF THE INVENTION

The object of the invention is to provide an adjustment latch structure for a folding bracket of display devices to achieve smooth operation and to make angular adjustment of the bracket easier.

The adjustment latch structure according to the invention includes a sliding member with an inner end extending in a bracket. The sliding member has an inner end fastened to an anchor blade. The anchor blade is coupled with a latch member on a front side that is movable upwards. The anchor blade and the latch member have teeth formed on the sides that face each other to engage with each other. There is a pulling member located under the latch member. The pulling member has protrusive members extending into corresponding housing slots of the latch member. The pulling member has a returning spring on one end. An elastic member presses the latch member on the top end of the front side so that the latch member is constantly engaged with the anchor blade thereunder. The whole structure is symmetrical in the center in normal condition. When the pulling member is lifted, the protrusive members push the latch member away from the anchor blade to separate the teeth, and the sliding member fastened to the anchor blade may be slid relative to the bracket to adjust the angle of the bracket relative to the base dock.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
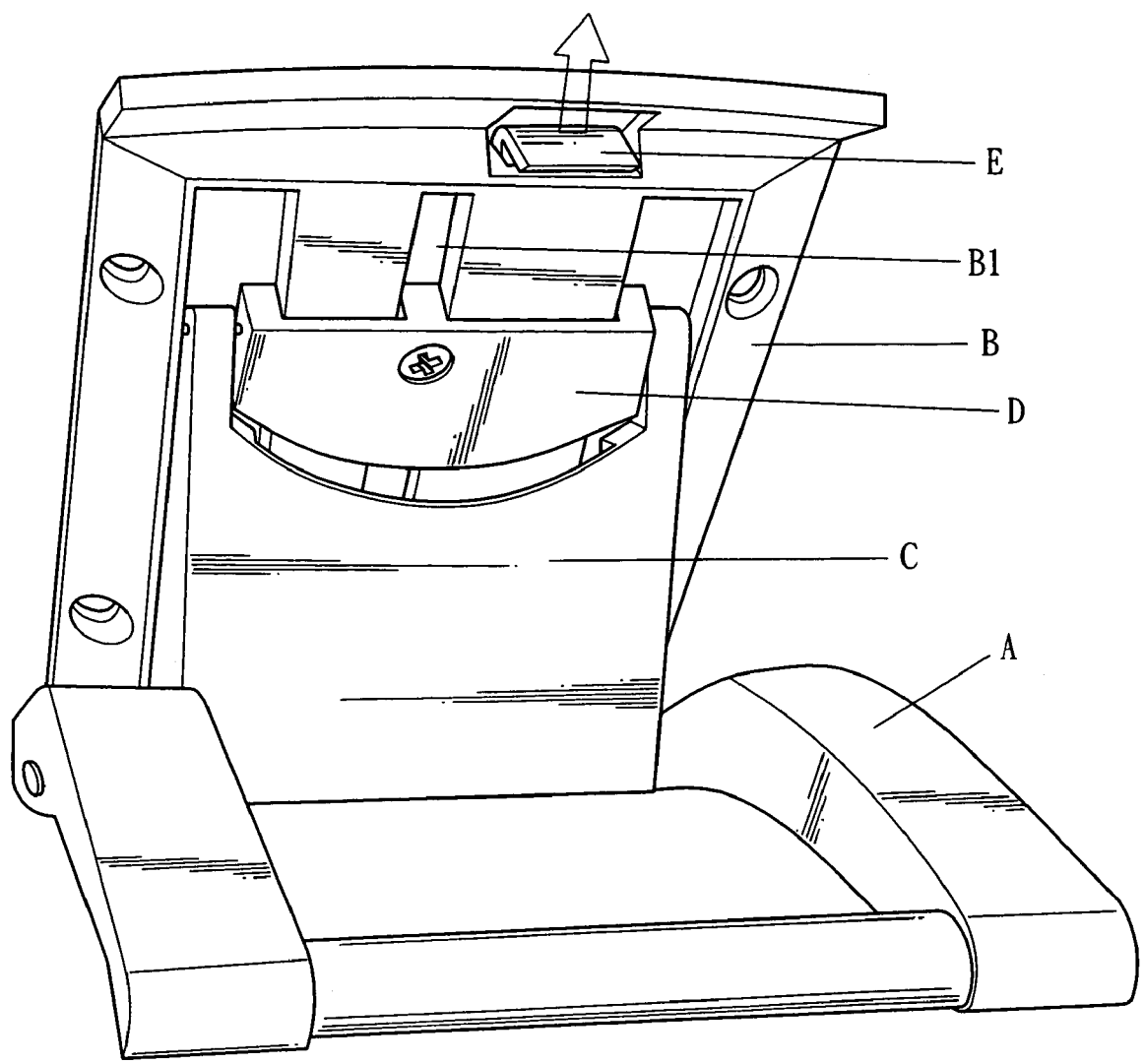
FIG. 1 is a schematic view of a conventional structure.
Figure 2:
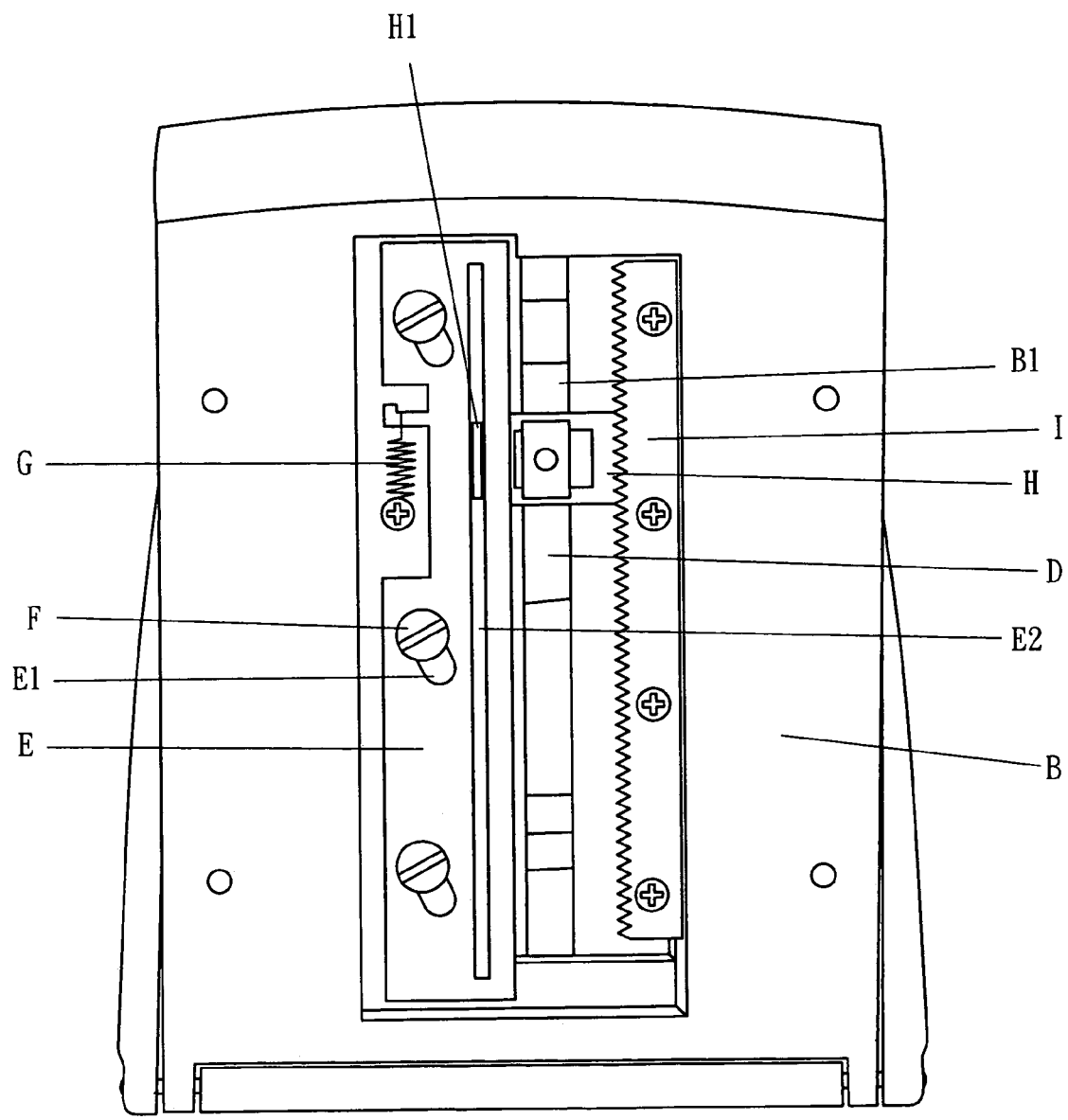
FIG. 2 is a schematic view of the latch unit of a conventional structure.
Figure 3:
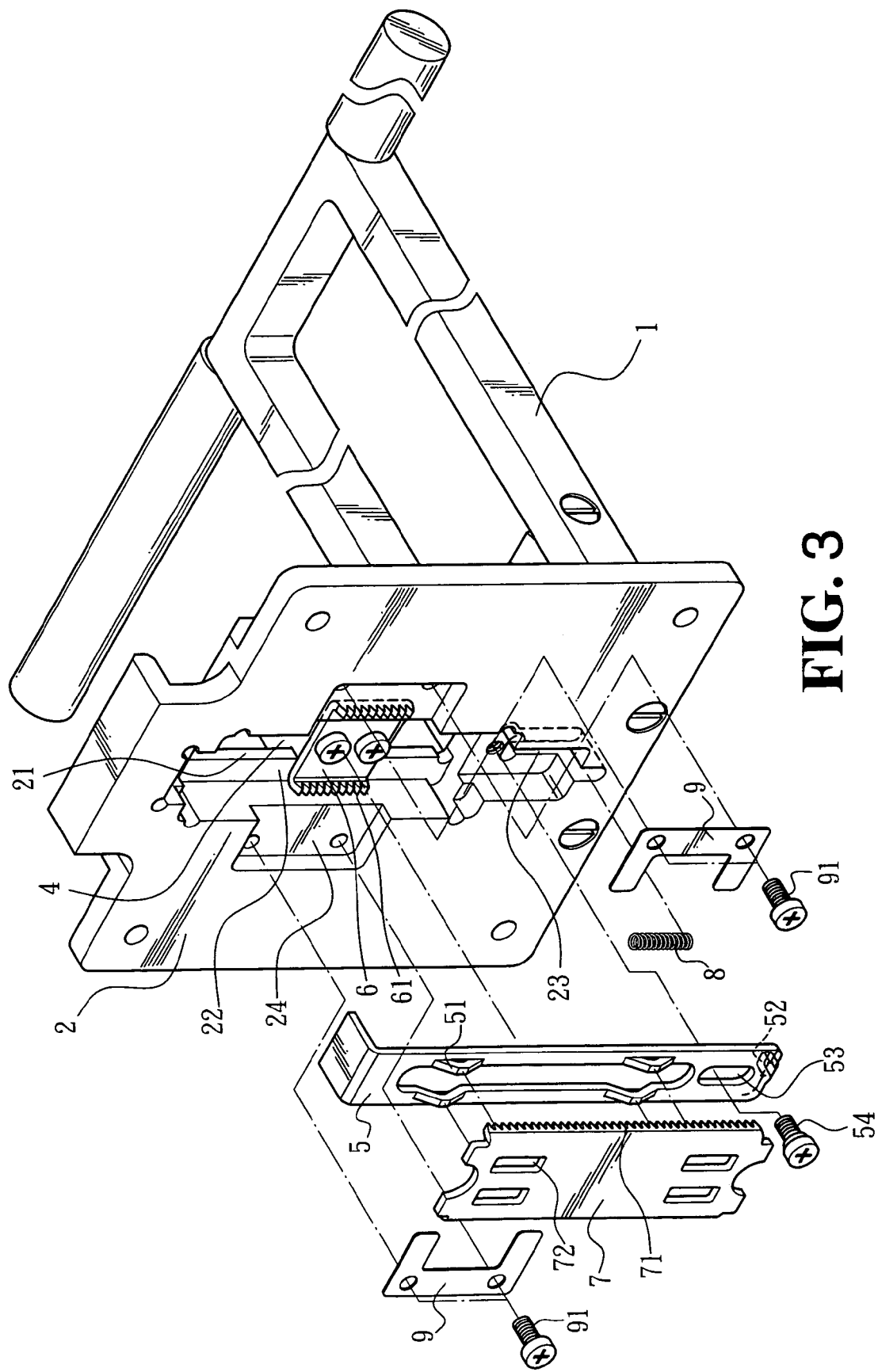
FIG. 3 is a schematic view of an embodiment of the invention.
Figure 4:
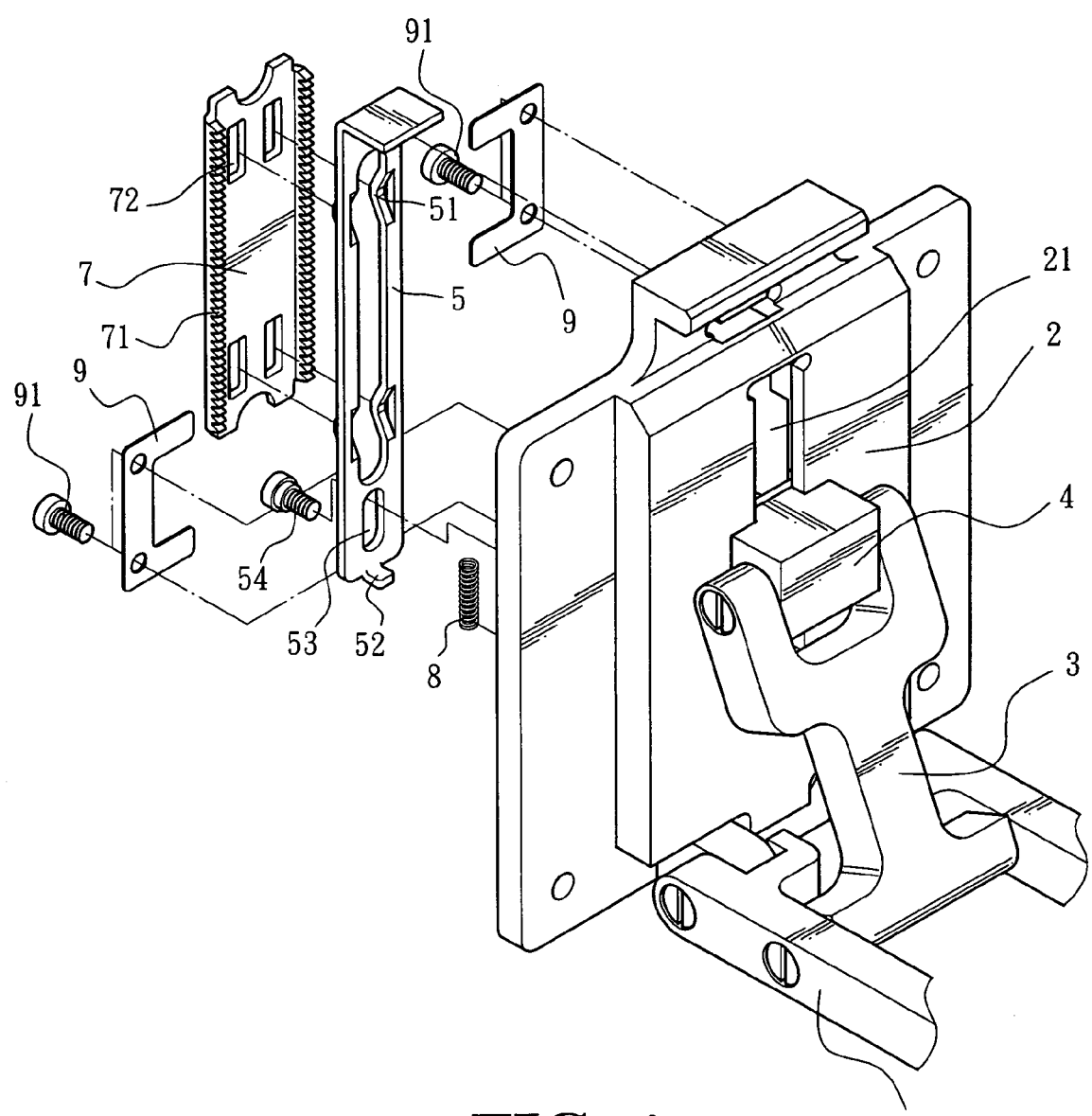
FIG. 4 is a schematic view of another embodiment of the invention.
Figure 5:
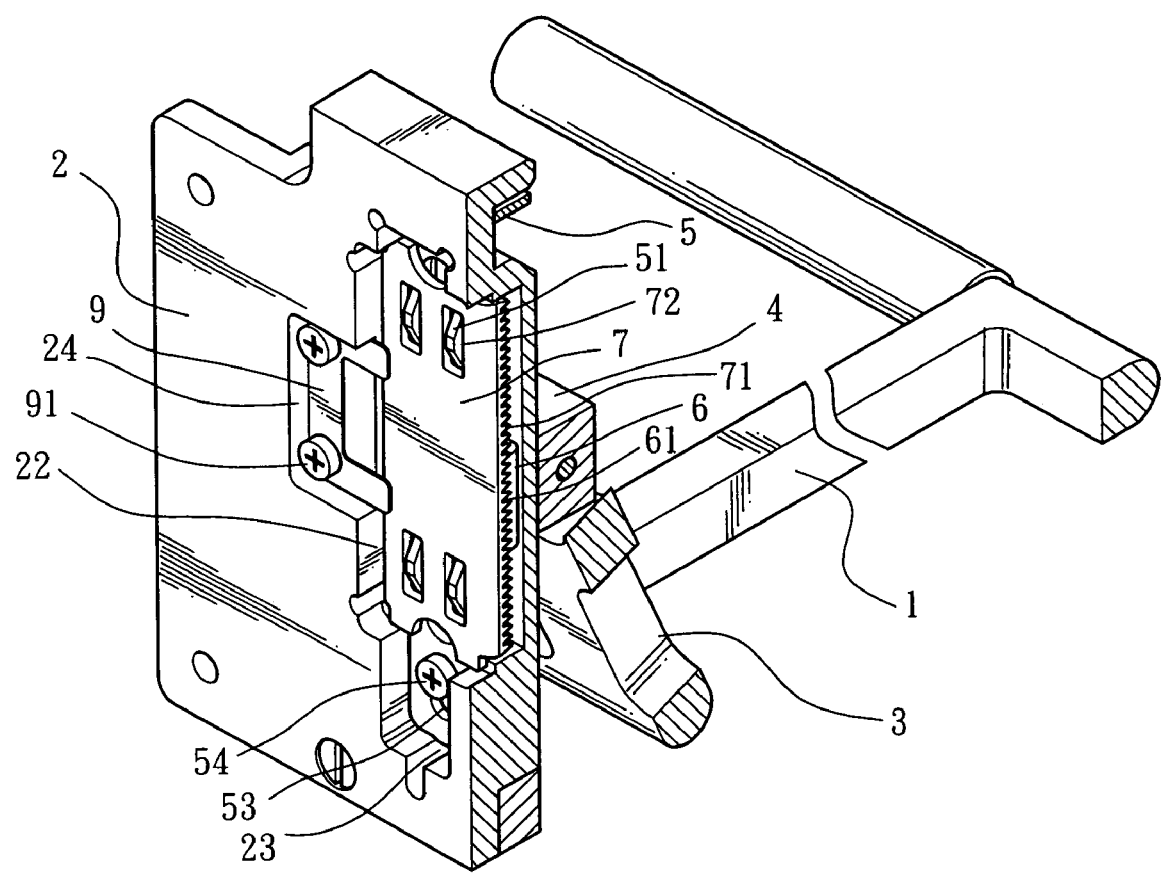
FIG. 5 is a sectional view of an embodiment of the invention.

Referring to FIGS. 3 and 4, the adjustment latch structure for a folding bracket according to the invention has a basic structure substantially the same as the conventional one that includes a base dock 1, a bracket 2 and a bracing rack 3 which has one end pivotally engaged with the base dock 1 and another end movably coupled on the bracket 2 that is extendable in <-shape (or L-shape). The bracing rack 3 is pivotally coupled with a sliding member 4 which is slidable on the bracket 2. There is a pulling member 5 located on the backside of the bracket 2. The main features of the invention are as follows (also referring to FIG. 5):

The sliding member 4 has an inner end extended in a slot 21 of the bracket 2 to fasten to an anchor blade 6.

The anchor blade 6 is housed in a sliding flute 22 formed on an inner side of the bracket 2, and is formed in ⊓-shape with the first teeth 61 on two sides. A latch member 7 is provided facing the front side of the anchor blade 6 and is movable upwards.

The latch member 7 is a rectangular and ⊓-shaped member housed in a sliding flute 22 formed on an inner side of the bracket 2 and has second teeth 71 on two sides engageable with the first teeth 61 of the anchor member 6. The latch member 7 has housing slots 72. The pulling member 5 is located under the latch member 7.

The pulling member 5 has protrusive members 51 formed on the surface corresponding to the housing slots 72 of the latch member 7. One end of the pulling member 5 is bent inwards to form a hook 52 which is extended into a trough 23 on an inner side of the bracket 2. The trough 23 houses a returning spring 8 which couples with the hook 52 to provide a returning elastic force on the pulling member 5 constantly. The pulling member 5 further has a slot 53 at one end to couple with a retaining strut 54.

The top end of the front side of the latch member 7 is pressed by an elastic element 9 so that the second teeth 71 of the latch member 7 are engaged automatically and constantly with the first teeth 61 of the anchor blade 6.

The elastic member 9 is fastened to a recess 24 formed on an inner side of the bracket 2 through bolts 91. As shown in the drawings, the elastic element 9 may be an elastic reed to press the latch member 7. It is to be noted that the elastic reed and its installed location shown in the drawings are not the limitation of the invention. Other elastic elements that can provide an equivalent function may be adopted, such as a cap housed compression spring to cover and press the latch member 7 (not shown in the drawings).

By means of the construction set forth above, the latch member 7 which is movable upwards is located on the front side of the anchor blade 6, and the pulling member 5 is located under the latch member 7, and the top end of the latch member 7 is pressed by the elastic element 9. The entire structure is located at the center in a symmetrical fashion. The elements and mechanisms can provide a balanced and coordinated motion.

Figures 6, 7:
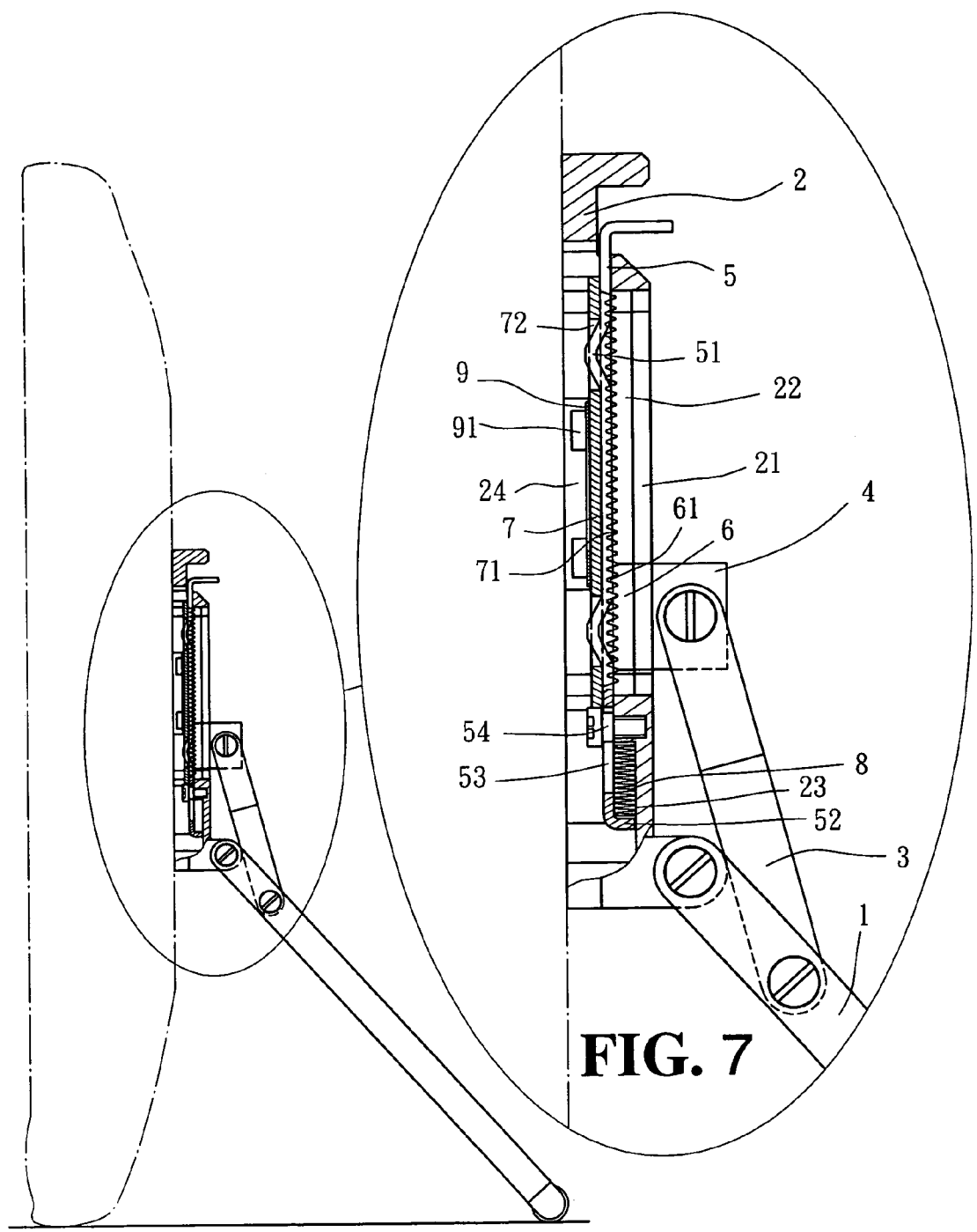
FIG. 6 is a schematic view of an embodiment of the invention in a use condition.
FIG. 7 is a fragmentary enlarged view of an embodiment of the invention in a use condition.

Referring to FIGS. 6 and 7, when the invention is in use on a display device, the bracket 2 is fastened to the backside of the display device. The base dock 1 is rested on a desktop in a biased manner. The bracing rack 3 anchors the display device on the base dock 1 at a desired angle. The anchoring of the bracing rack 3 is accomplished through the engagement of the first teeth 61 of the anchor blade 6 at the inner end of the sliding member 4 and the second teeth 71 of the latch member 7.

Figure 8:
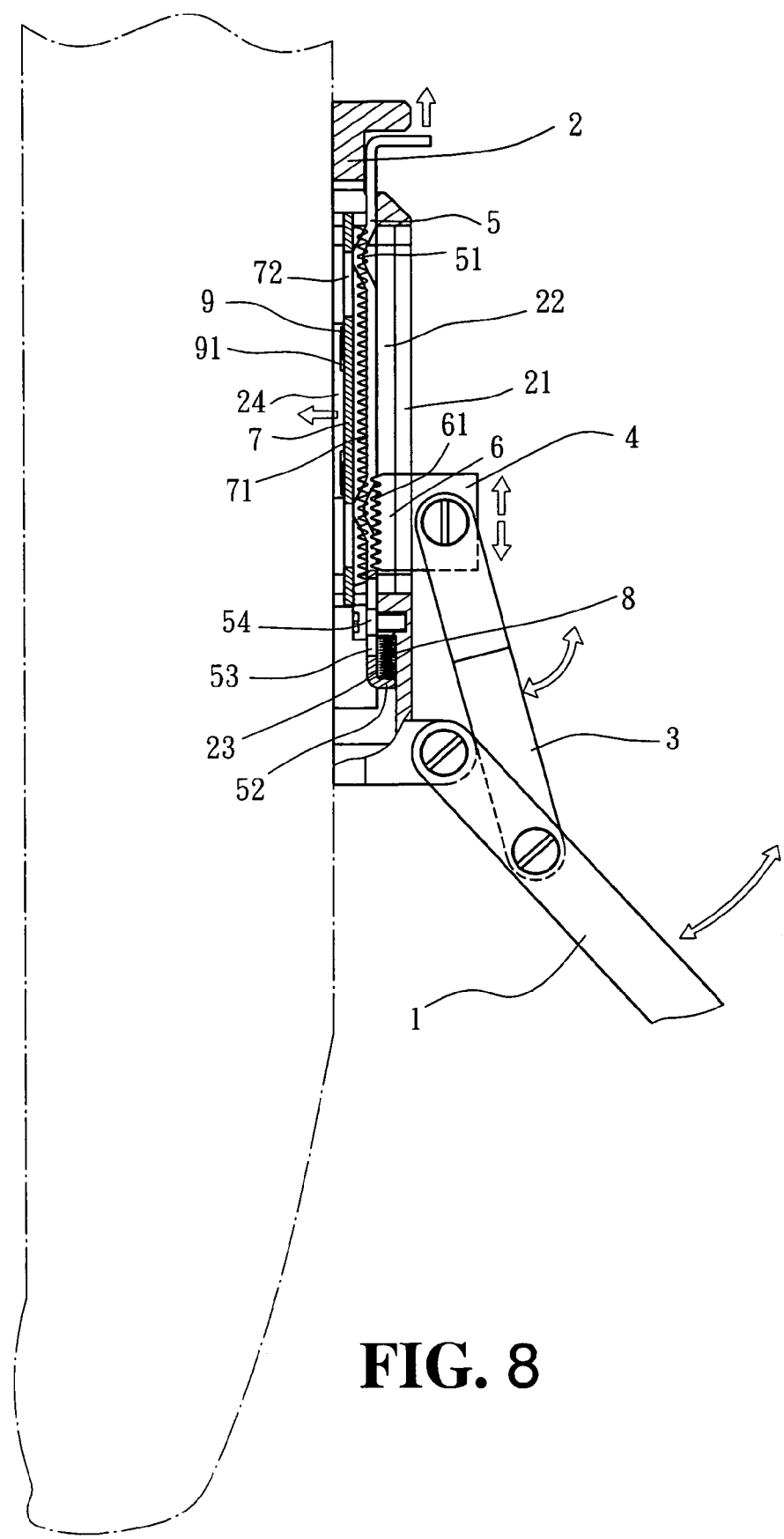
FIG. 8 is a schematic view of an embodiment of the invention in an adjusting condition.
Figure 9:
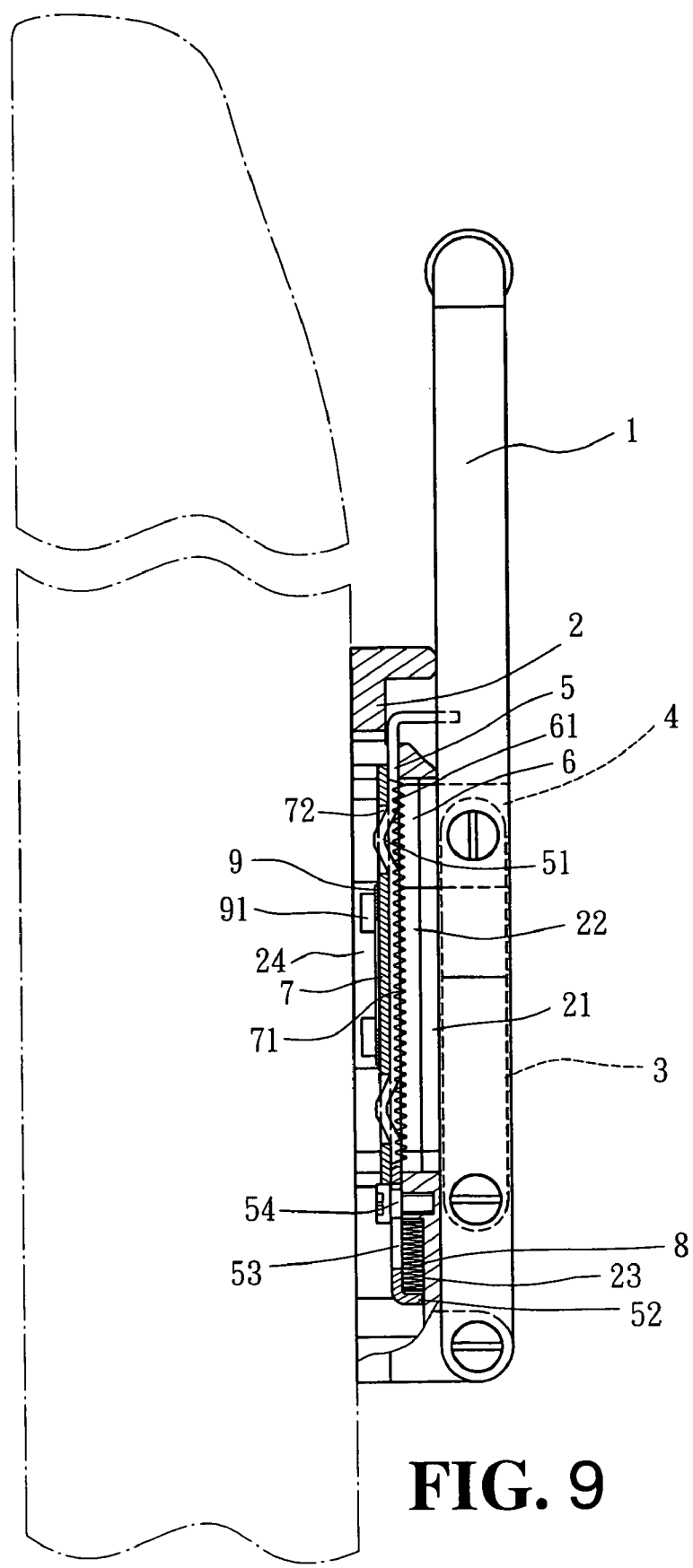
FIG. 9 is a schematic view of an embodiment of the invention in a folding condition.

For adjusting the biased angle of the base dock 1 or folding, referring to FIG. 8, lift the pulling member 5 to move the protrusive members 51 away from the housing slots 72 to push the latch member 7. The latch member 7 may be lifted and the second teeth 71 may be separated from the first teeth 61 to release the engagement condition. The originally latched sliding member 4 may be slid in the slot 21 relative to the bracket 2 so that the base dock 1 and the bracing rack 3 become a movable linkage mechanism for adjusting the angle of the base dock 1. Once the pulling member 5 returns, it is latched automatically. Referring to FIG. 9, the base dock 1 may also be folded towards the bracket 2 to collapse the bracing rack 3 into the base dock 1 to reduce the size and facilitate packaging or hanging on the wall.

What is claimed is:

1. An adjustment latch structure for a folding bracket of display devices, comprising:
    a linkage mechanism including a base dock, a bracket and a bracing rack which is engaged with a sliding member to pivotally couple with the bracket in a movable manner; and
    a pulling member located on an inner surface of a back side of the bracket;
    wherein the sliding member has an inner end extending to an inner side of the bracket to fasten to an anchor blade, the anchor blade having a front side coupling with a latch member, which is movable upwards, the anchor blade and the latch member having respectively first teeth and second teeth facing each other and engageable with each other, the pulling member being located under the latch member and having protrusive members to push the latch member, the pulling member having one end engaged with a returning spring, the latch member having a top end on a front side pressing by an elastic element so that the latch member is automatically and constantly engaged with the anchor blade.

2. The adjustment latch structure of claim 1, wherein the latch member has housing slots to accommodate the protrusive members of the pulling member.

\* \* \* \* \*